United States Patent
Grundei et al.

(10) Patent No.: US 10,207,597 B2
(45) Date of Patent: Feb. 19, 2019

(54) FUEL CELL SYSTEM AS WELL AS VEHICLE HAVING SUCH A FUEL CELL SYSTEM

(71) Applicant: Volkswagen AG, Wolfsburg (DE)

(72) Inventors: Daniel Grundei, Braunschweig (DE);
Oliver Berger, Braunschweig (DE);
Christian Lucas, Braunschweig (DE);
Oliver Kleppa, Hannover (DE)

(73) Assignee: Audi AG, Ingolstadt (DE)

( * ) Notice: Subject to any disclaimer, the term of this patent is extended or adjusted under 35 U.S.C. 154(b) by 229 days.

(21) Appl. No.: 14/977,959

(22) Filed: Dec. 22, 2015

(65) Prior Publication Data
US 2016/0190611 A1 Jun. 30, 2016

(30) Foreign Application Priority Data

Dec. 29, 2014 (DE) .................. 10 2014 227 014

(51) Int. Cl.
| | |
|---|---|
| *H01M 8/04* | (2016.01) |
| *B60L 11/18* | (2006.01) |
| *H01M 8/04007* | (2016.01) |
| *H01M 8/04111* | (2016.01) |
| *H01M 8/04029* | (2016.01) |

(Continued)

(52) U.S. Cl.
CPC ....... *B60L 11/1894* (2013.01); *B60L 11/1883* (2013.01); *B60L 11/1892* (2013.01); *H01M 8/04029* (2013.01); *H01M 8/04067* (2013.01); *H01M 8/04111* (2013.01); *H01M 8/04141* (2013.01); *H01M 8/04149* (2013.01); *H01M 2008/1095* (2013.01); *H01M 2250/20* (2013.01); *Y02T 90/32* (2013.01)

(58) Field of Classification Search
CPC .......... H01M 8/04111; H01M 8/0267; H01M 8/0271; H01M 8/04007; H01M 2250/20
See application file for complete search history.

(56) References Cited

U.S. PATENT DOCUMENTS

| | | | |
|---|---|---|---|
| 5,968,680 A | 10/1999 | Wolfe et al. | |
| 2004/0121207 A1* | 6/2004 | Bunker | H01M 8/04007 |
| | | | 429/415 |
| 2006/0029849 A1* | 2/2006 | Metzler | H01M 8/04029 |
| | | | 429/414 |

FOREIGN PATENT DOCUMENTS

| | | |
|---|---|---|
| DE | 10203311 | 7/2003 |
| EP | 1306916 | 5/2003 |

(Continued)

*Primary Examiner* — Olatunji A Godo
(74) *Attorney, Agent, or Firm* — Davidson, Davidson & Kappel, LLC

(57) ABSTRACT

A fuel cell system including: a fuel cell stack; a cathode gas supply system including a cathode supply path for feeding cathode operating gas into the fuel cell stack and a cathode exhaust gas path for discharging cathode exhaust gas out of the fuel cell stack, and a fuel cell cooling system for cooling the fuel cell stack including a coolant path into which the fuel cell stack is integrated so as to transfer heat is provided. It is provided that the cathode gas supply system also includes a turbine arranged in the cathode exhaust gas path, and the coolant path of the fuel cell cooling system in the flow path of the cathode exhaust gas downstream from the turbine is in heat-transferring contact with the cathode exhaust gas path. This achieves a cooling of the coolant by the cathode exhaust gas and a heating of the cathode exhaust gas by the coolant.

16 Claims, 2 Drawing Sheets

(51) Int. Cl.
*H01M 8/04119* (2016.01)
*H01M 8/1018* (2016.01)

(56) References Cited

FOREIGN PATENT DOCUMENTS

| | | |
|---|---|---|
| JP | 2009076216 | 4/2009 |
| WO | WO2013/039022 | 3/2013 |

* cited by examiner

FUEL CELL SYSTEM AS WELL AS VEHICLE HAVING SUCH A FUEL CELL SYSTEM

This claims the benefit of German Patent Application DE102014227014.6, filed Dec. 29, 2014 and hereby incorporated by reference herein.

The invention relates to a fuel cell system as well as to a vehicle having such a fuel cell system.

BACKGROUND

Fuel cells utilize the chemical reaction of a fuel with oxygen to form water in order to generate electric energy. For this purpose, the core component of fuel cells is the so-called membrane electrode assembly (MEA), which consists of an ion-conductive (usually proton-conductive) membrane and an electrode (anode and cathode) arranged on each side of the membrane. Moreover, it is also possible to arrange gas diffusion layers (GDL) on both sides of the membrane electrode assembly on the sides of the electrodes facing away from the membrane. As a rule, the fuel cell is formed by a plurality of stacked MEAs whose electric outputs are cumulative. As a rule, there are bipolar plates (also called flow field plates) arranged between the individual membrane electrode assemblies and they ensure that the individual cells are supplied with the operating media, in other words, the reactants, in addition to which they also serve for cooling purposes. Moreover, the bipolar plates establish an electrically conductive contact with the membrane electrode assemblies.

During operation of the fuel cell, the fuel, especially hydrogen $H_2$ or a gas mixture containing hydrogen, is fed to the anode via a flow field of the bipolar plate that is open on the anode side, where an electrochemical oxidation of $H_2$ to form $H^+$ takes place while electrons are released. A (hydrous or anhydrous) transport of the protons $H^+$ from the anode space into the cathode space takes place via the electrolytes or the membrane which separates the reaction spaces and electrically insulates them from each other in a gas-tight manner. The electrons provided on the anode are fed to the cathode via an electric line. Oxygen or a gas mixture containing oxygen (for instance, air) is fed to the cathode via a flow field of the bipolar plate that is open on the cathode side so that a reduction of $O_2$ to form $O^{2-}$ takes place while electrons are picked up. At the same time, the oxygen anions react in the cathode space with the protons that have been transported via the membrane, a process in which water is formed.

In order to supply the fuel cell stack with its operating media, in other words, the reactants, the fuel cell stack has, on the one hand, an anode gas supply system and, on the other hand, a cathode gas supply system. The anode gas supply system comprises an anode supply path for feeding an anode operating gas into the anode spaces of the stack, and an anode exhaust gas path for discharging an anode exhaust gas out of the anode spaces. By the same token, the cathode gas supply system comprises a cathode supply path for feeding a cathode operating gas into the cathode spaces, and a cathode exhaust gas path for discharging a cathode exhaust gas out of the cathode spaces of the fuel cell stack.

SUMMARY OF THE INVENTION

During the operation of the fuel cell, the fuel cell reaction generates heat, which is why the fuel cell stack is integrated into a cooling circuit that discharges the waste heat via a coolant. The coolant is cooled, for example, by means of an air cooler; in the case of a vehicle, this is normally a radiator. Moreover, the waste heat is partially transported away by the exhaust gases of the fuel cell. Another problem is the product water that is generated during the fuel cell reaction, most of which is transported away via the cathode exhaust gas. At low ambient temperatures, it is necessary to prevent freezing of condensed water in the fuel cell and in the exhaust gas lines.

Japanese patent application JP 2009-076216 A discloses the approach of condensing the product water contained in the cathode exhaust gas and then using it to cool the fuel cell stack.

It is likewise a known procedure to utilize the waste heat contained in the cathode exhaust gas by employing heat exchangers. European patent application 1 306 916 A1 describes the technique of integrating the heat exchanger of a fuel cell cooling circuit into the cathode exhaust gas path of the fuel cell stack in order to cool the cathode exhaust gas before it is conveyed to a condenser for purposes of recovering the product water.

In the case of solid oxide fuel cells (SOFC), which are operated at very high temperatures, it is also a known procedure to utilize the waste heat in the cathode exhaust gas by employing heat exchangers. For instance, international patent application WO 2013/039022 A1 describes controlling the temperature of a secondary battery in that the cooling takes place by means of the cathode supply air of the fuel cell and the battery is heated by means of the hot cathode exhaust gas. If the battery is being discharged in an exothermic process, the cooling takes place via the cathode supply air, and if the battery is being charged in an endothermic process, the cathode exhaust gas is heated up. The heat transfer takes place via an air heat exchanger.

It is a challenge to provide lower coolant temperatures in order to cool the fuel cell stack as well as other components of the system, for example, the electric motor of an electric turbocharger or its power electronics. Thus, for instance, the intake air of fuel cell stacks at high temperatures is often cooled over large cooling surfaces or by auxiliary coolers which are accommodated, for example, in the wheel wells of the vehicle. This creates the need for a large installation space. In order to limit the cooling load of the fuel cell stack, it is also a known procedure to lower the fuel cell output and/or to change several operating parameters (for example, reducing the operating pressure or the mass flows of the operating gas). The reduction in output, however, goes hand in hand with undesired output losses in vehicles, whereas shifting the operating point entails a deterioration of the efficiency as well as a reduction of the service life of the stack.

Auxiliary aggregates of the fuel cell system are also integrated into external cooling circuits that are at a low temperature, or else components are employed that have a better temperature resistance, as a result of which the cooling problem, however, is merely shifted or the design freedom is restricted.

The present invention provides a fuel cell system, especially for a vehicle, with which the drawbacks of the state of the art are at least partially eliminated.

The present invention provides a fuel cell system including:
 a fuel cell stack,
 a cathode gas supply system, comprising a cathode supply path for feeding cathode operating gas into the fuel cell stack and a cathode exhaust gas path for discharging cathode exhaust gas out of the fuel cell stack, and a fuel cell cooling system for cooling the fuel cell stack, comprising a coolant path into which the fuel cell stack is integrated so as to transfer heat.

The fuel cell system according to the invention is characterized in that the cathode gas supply system also comprises a turbine arranged in the cathode exhaust gas path, and the coolant path of the fuel cell cooling system in the flow path of the cathode exhaust gas downstream from the turbine is in heat-transferring contact with the cathode exhaust gas path. The turbine allows a relief of the cathode exhaust gas and thus a cooling of the cathode exhaust gas. The relatively low exhaust gas temperature makes it possible to cool the coolant by means of the cathode exhaust gas and to heat the cathode exhaust gas by means of the coolant. The turbine is preferably mechanically connected to a compressor arranged in the cathode supply path in order to assist or effectuate its drive. Therefore, the expression "heat-transferring contact of the coolant path with the cathode exhaust gas path" includes a heat-transferring contact between the coolant and the cathode exhaust gas while excluding an exchange of material.

Therefore, the integration of the cathode exhaust gas path into the coolant path of the fuel cell cooling system leads to a heat transfer between the coolant and the cathode exhaust gas, so that, owing to the cool exhaust gas, the temperature of the coolant is lowered. Even if this measure for cooling the coolant is not sufficient as the sole cooling measure in the fuel cell cooling system, thanks to the lesser cooling requirements, the invention nevertheless allows a smaller dimensioning of an auxiliary or main cooler of the cooling system, for instance, a vehicle radiator. Moreover, if the system has been at a standstill for a prolonged period of time, especially at low ambient temperatures, the coolant can be brought to the operating temperature by means of the exhaust gas flow, which heats up considerably faster. On the other hand, the invention achieves an increase in the temperature of the cathode exhaust gas, as a result of which condensation of the gaseous product water in the cathode exhaust gas is prevented or else water that has already condensed even evaporates. Consequently, the additional evaporation energy can be employed to attain further cooling of the coolant. At the same time, the fraction of liquid water in the cathode exhaust gas is reduced and it might be possible to dispense with additional measures and components in order to drain the liquid water or to prevent condensation. As a result, the invention makes it possible to reduce the energy demand and thus to increase the efficiency of the entire system.

In a preferred embodiment of the invention, the cathode gas supply system also comprises a humidifier, especially a membrane humidifier, through which the cathode exhaust gas flows. In this case, the coolant path of the fuel cell cooling system is in the flow path of the cathode exhaust gas, preferably downstream from the humidifier in heat-transferring contact with the cathode exhaust gas path. The use of humidifiers, especially of membrane humidifiers, in order to humidify a cathode operating gas that is to be fed to a fuel cell stack is known in the state of the art. In this process, the cathode operating gas that is to be humidified and fed to the fuel cell is conveyed via a water vapor-permeable membrane through which the more humidified cathode exhaust gas flows from the other side of the membrane. Humidity is transferred to the cathode operating gas via the membrane, so that the polymer electrolyte membrane of the fuel cell stack achieves the humidity it needs. Owing to the arrangement of the humidifier upstream from the heat-transferring contact, the temperature is reduced further and the relative humidity of the catalyst exhaust gas is achieved.

Especially preferably, the humidifier is arranged upstream from the turbine in the cathode exhaust gas path. In this manner, the original high humidity of the cathode exhaust gas as it enters the humidifier is utilized and the humidifying potential for the cathode operating gas in increased.

According to a preferred embodiment of the invention, aside from the fuel cell stack, at least one additional component that is to be cooled is integrated into the coolant path of the fuel cell cooling system. In this context, the expression "integrated into the cooling system" refers to an arrangement such that the component that is to be cooled is in heat-transferring contact with the coolant path, so that heat is transferred from the component to the coolant. The integration of an additional component that is to be cooled into the fuel cell cooling system reduces the complexity of the system and the cooling potential is optimally utilized. The additional component that is to be cooled is preferably the electric motor of an electric compressor, especially for the cathode operating gas and/or the power electronics of such an electric motor, since these components are often very temperature-sensitive when exposed to intense heat.

According to one embodiment of the invention, the at least one additional component that is to be cooled and the heat-transferring contact with the cathode exhaust gas path are connected in series in the flow path of the coolant, in other words, they are connected one after the other. This embodiment is technically simple to implement since it entails simple piping work and only requires a small amount of space.

Preferably, the at least one additional component that is to be cooled is arranged in the flow path of the coolant downstream from the heat-transferring contact with the cathode exhaust gas path. As a result, the component is exposed to a very low coolant inlet temperature, so that particularly temperature-sensitive components can be effectively cooled.

Preferably, the fuel cell stack and the heat-transferring contact with the cathode exhaust gas path are connected in parallel to each other in the flow path of the coolant. In comparison to a series connection, this embodiment has the advantage that it is technically simpler to implement in terms of the line configuration, and it requires less space.

As an alternative, however, the fuel cell stack and the heat-transferring contact with the cathode exhaust gas path can be likewise connected in series, that is to say, one after the other, in the flow path of the coolant, and especially to arrange the fuel cell stack upstream from the heat-transferring contact with the cathode exhaust gas path. This embodiment allows a reduction in the temperature level throughout the cathode exhaust gas in the entire cooling circuit and thus translates into a particularly effective cooling of the components integrated into it.

Preferably, the heat-transferring contact of the coolant path with the cathode exhaust gas path is effectuated by means of a heat exchanger. Heat exchangers have a large heat exchange surface area between the appertaining media and have become well-established in a wide array of configurations.

According to another advantageous embodiment of the invention, a heat exchanger arranged in the cathode supply path for purposes of cooling or heating the cathode operating gas (depending on the operating point of the fuel cell) is integrated into the coolant path of the fuel cell cooling system. In this manner, simple means can achieve cooling of the cathode operating gas that has heated up due to the compression before entering the fuel cell stack, especially at operating points associated with a greater load. At operating points in the lower load range, in contrast, when the compressed air is cooler than necessary, the heating takes place by means of the heat exchanger.

Another aspect of the present invention relates to a vehicle that has a fuel cell system according to the present invention. In this context, the fuel cell system especially serves to supply an electric drive aggregate of the vehicle or to charge a battery.

The various embodiments of the invention cited in this application can be advantageously combined with each other, unless otherwise indicated in individual cases.

BRIEF DESCRIPTION OF THE DRAWINGS

The invention will be described below by means of embodiments on the basis of the accompanying drawings. The following is shown.

DETAILED DESCRIPTION

Figure 1:
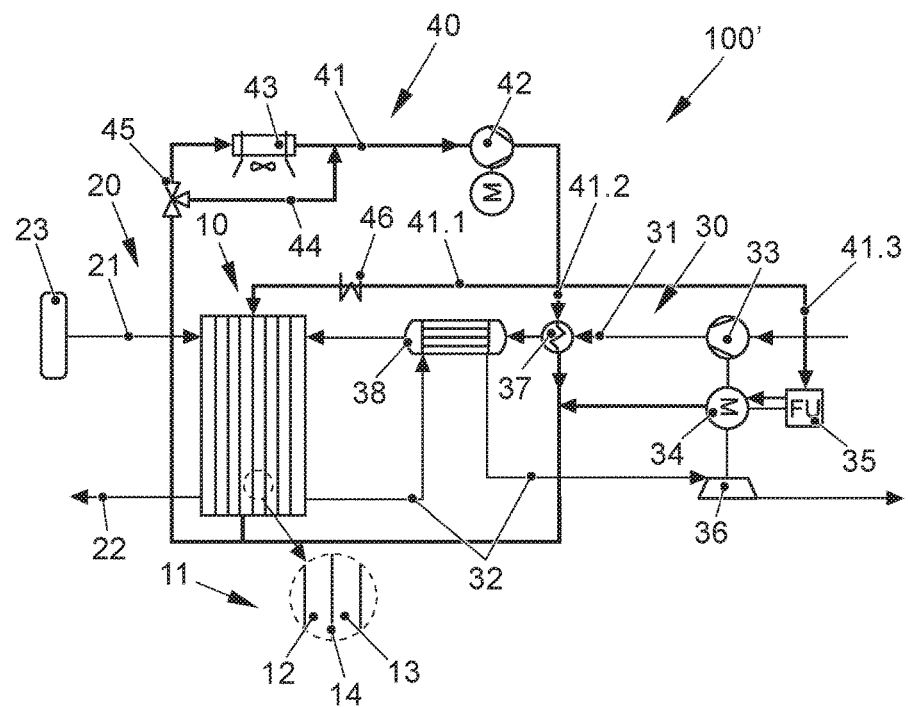
FIG. 1 a flow chart of a conventional fuel cell system.

FIG. 1 shows a conventional fuel cell system designated in its entirety by the reference numeral 100'. The fuel cell system 100' is part of a vehicle, especially an electric vehicle, which has an electric traction motor that is supplied with electric energy by the fuel cell system 100'.

As its core component, the fuel cell system 100' comprises a fuel cell stack 10 that has a plurality of stacked individual cells 11, each of which comprises an anode space 12 as well as a cathode space 13 that are separated from each other by an ion-conductive polymer electrolyte membrane 14 (see detail cutout view). The anode and cathode spaces 12, 13 each have a catalytic electrode, namely, the anode or the cathode, which catalyze the appertaining partial reaction of the fuel cell reaction. Between two such membrane electrode units, there is also a bipolar plate that serves to feed the operating media into the anode and cathode spaces 12, 13 and that also establishes the electric connection between the individual fuel cells 11.

In order for the fuel cell stack 10 to be supplied with the operating gases, the fuel cell system 100' has an anode gas supply system 20 on the one hand, and a cathode gas supply system 30 on the other hand.

The anode gas supply system 20 comprises an anode supply path 21 that serves to feed an anode operating gas (the fuel), for example, hydrogen, into the anode space 12 of the fuel cell stack 10. For this purpose, the anode supply path 21 connects a fuel reservoir 23 to an anode inlet of the fuel cell stack 10. The anode gas supply system 20 also comprises an anode exhaust gas path 22 that discharges the anode exhaust gas out of the anode spaces 12 via an anode outlet of the fuel cell stack 10. Moreover, the anode gas supply system 20 can have a fuel recirculation line that connects the anode exhaust gas path 22 to the anode supply path 21. The recirculation of fuel is a conventional process to return and to utilize the fuel, which is usually employed more than stoichiometrically.

The cathode gas supply system 30 comprises a cathode supply path 31 that feeds a cathode operating gas containing oxygen, especially air, into the cathode spaces 13 of the fuel cell stack 10. The cathode supply system 30 also comprises a cathode exhaust gas path 32 that discharges the cathode exhaust gas (especially the exhaust air) out of the cathode spaces 12 of the fuel cell stack 10 and, if applicable, conveys it to an exhaust gas system (not shown here). In order to convey and compress the cathode operating gas, there is a compressor 33 in the cathode supply path 31 which especially is an electric turbocharger (ETC) that is operated by an electric motor 34 having power electronics 35. Optionally, as shown here, the compressor 33 can be driven with the assistance of a turbine 36 that is arranged in the cathode exhaust gas path 32. In this context, the compressor 33 and the turbine 36 are connected to each other via a shared shaft. Downstream from the compressor 33, a heat exchanger (intercooler) 37 is integrated into the cathode supply path 31 and, as a function of the operating point, it serves to cool or heat the cathode operating gas that has been compressed by the compressor 33.

Moreover, the cathode gas supply system 30 has a humidifier 38 that humidifies the cathode operating gas. In this process, the cathode operating gas that is to be humidified as well as the more humidified cathode exhaust gas are conveyed on both sides through a water vapor-permeable membrane so that the water vapor diffuses out of the humidified cathode exhaust gas through the membrane into the dry cathode operating gas, thereby humidifying it. The humidifier 38 is arranged, on the one hand, in the cathode supply path 31 between the compressor 33 and the cathode input and, on the other hand, in the cathode exhaust gas path 32 between the turbine 36 and the cathode output of the stack 10.

For the sake of clarity, several other details of the anode and cathode gas supply systems 20, 30 are not shown in the simplified FIG. 1. For instance, the humidifier 38 can be bypassed by an appropriate bypass line on the side of the cathode supply path 31 as well as on side of the cathode exhaust gas path 32. There can also be a turbine bypass line that bypasses the turbine 36 on the side of the cathode exhaust gas path 32. Furthermore, there can be a wastegate line that connects the cathode supply line 31 to the cathode exhaust gas line 32. Moreover, a water separator can be installed in the anode and/or cathode exhaust gas path 22, 32 in order to condense and drain the product water generated by the fuel cell reaction. Finally, the anode exhaust gas line 26 can open into the cathode exhaust gas line 32 so that the anode exhaust gas and the cathode exhaust gas are discharged via a shared exhaust gas system.

The fuel cell system 100' shown in FIG. 1 also comprises a fuel cell cooling system which is designated in its entirety by the reference numeral 40 and which is integrated into the fuel cell stack 10 in a heat-exchanging manner. The coolant that is circulating in the coolant path 41 is conveyed by a coolant pump 42 driven by an electric motor. The coolant, which especially is water, a water-alcohol mixture or a water-ethylene glycol mixture, is conveyed via a main cooler 43 which, in case of a vehicle, is normally a radiator equipped with an air fan. The main cooler 43 can be bypassed by a cooler bypass line 44, whereby a valve 45 controls the mass flows of the coolant through the main cooler 43 and the bypass line 44.

The main cooling circuit 41.1 of the coolant path 41 surrounds the fuel cell stack 10. Moreover, downstream from coolant pump 42, the coolant path 41 branches off so that, in a cooling circuit side branch 41.2, it passes through the heat exchanger 37 situated in the cathode flow path 31, as a result of which a heat-transferring contact between the coolant and the cathode operating gas takes place. Another cooling circuit side branch 41.3 integrates the power electronics 35 as well as the electric motor 34 of the electric turbocharger 33. In the embodiment of the state of the art shown, the components, namely, the fuel cell stack 10, the heat exchanger 37 as well as the power electronics 35 or the electric motor 34 are connected in parallel in the various branches 41.1, 41.2 or 41.3 of the coolant path 41.

Figure 2:
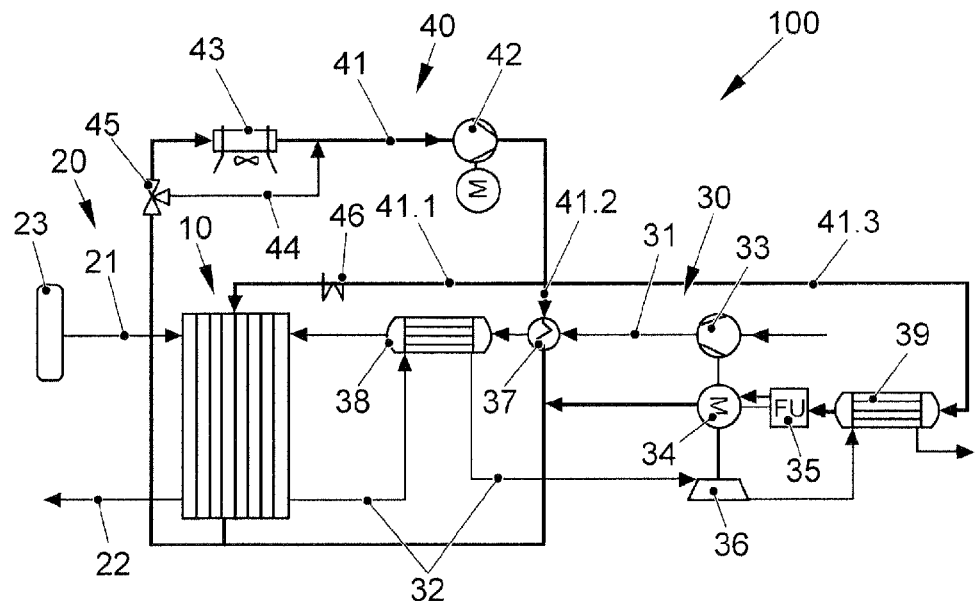
FIG. 2 a flow chart of a fuel cell system according to an embodiment of the invention.
Figure 3:
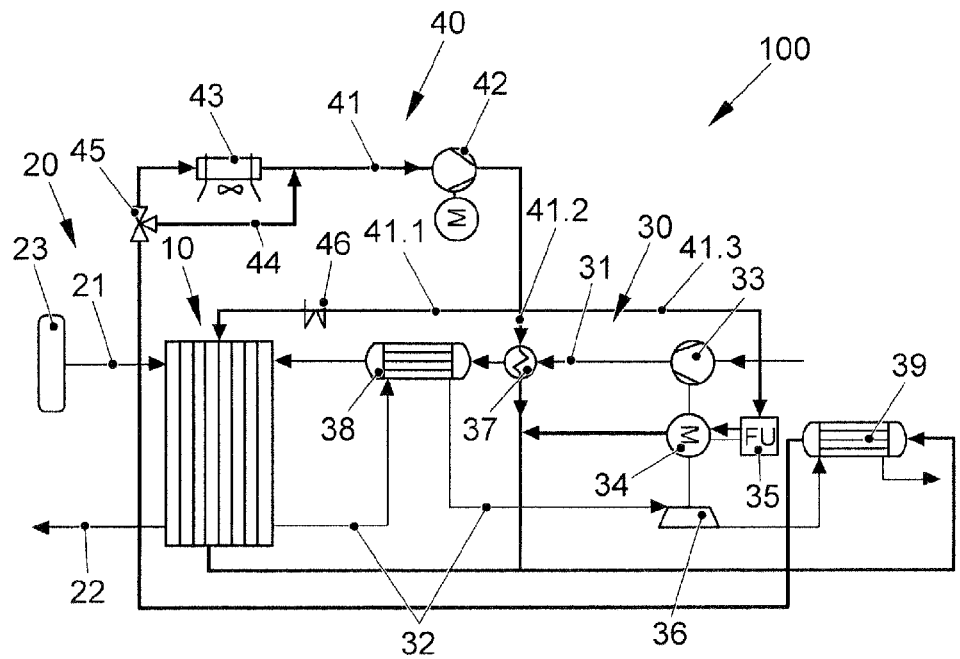
FIG. 3 a flow chart of a fuel cell system according to another embodiment of the invention.

FIGS. 2 and 3 each show a fuel cell system 100 according to several embodiments of the present invention. Here, equivalent elements are designated with the same reference numerals as in FIG. 1 and they exhibit the properties and functions described there.

In accordance with the fuel cell system 100 according to the invention shown in FIGS. 2 and 3, the cathode gas supply system 30 has a heat exchanger 39 which is arranged in the cathode exhaust gas path 32. The heat exchanger 39 is configured in such a way that the cathode exhaust gas path 32 or the cathode exhaust gas is in heat-transferring contact with the coolant path 41 or with the coolant of the fuel cell cooling system 40. Consequently heat is transferred inside the heat exchanger 39 between the coolant and the cathode exhaust gas. In particular, the coolant is cooled in the heat exchanger 39 by the cathode exhaust gas, or else the cathode exhaust gas is heated by the coolant. The heat exchanger 39 is situated downstream from the turbine 36 in the flow path of the cathode exhaust gas. Moreover, if the system has been at a standstill for a prolonged period of time, especially at low ambient temperatures, the coolant can be brought to the operating temperature by means of the exhaust gas flow that heats up considerably faster.

At the cathode outlet of the fuel cell stack 10, there is a low-oxygen cathode exhaust gas at temperatures of typically up to 100° C., especially within the range from 60° C. to 100° C., and having a high relative humidity of between 80% and 100%. The humidity content as well as the temperature decrease in the humidifier 38. Owing to the expansion of the turbine 36, the cathode exhaust gas continues to cool down and the water partially condenses. After the expansion, depending on the operating point, the cathode exhaust gas is typically at a temperature of about 50° C. at a relative to humidity of 100%. This relatively low temperature is utilized according to the invention in order to further cool down the coolant of the cooling system 40. As a result, the main cooler 43 is assisted and can be dimensioned smaller. At the same time, the temperature of the cathode exhaust gas in the heat exchanger 39 rises. This prevents additional water from condensing or else water that has already condensed even evaporates. This makes it possible to dispense with the work normally required in the state of the art for purposes of discharging liquid water in order to avoid ice formation in the line system. The evaporation energy of the water also causes further cooling and thus further generation of cooling energy that is utilized by the coolant in the cooling system for itself.

In the embodiment shown in FIG. 2, the heat exchanger 39 is in the side branch 41.3 of the coolant path 41 and is thus connected in parallel to the fuel cell stack 10, which is integrated into the main coolant circuit 41.1. Moreover, additional components of the fuel cell system 100, namely, the electric motor 34 of the electric compressor 33 as well as the power electronics 35, are integrated into the side branch 41.3 of the coolant path 41. In particular, these components are connected in series, in other words, one after the other, with respect to the flow path of the coolant, whereby the components 34 and 35 are arranged downstream from the heat exchanger 39. Since the outlet temperature of the coolant out of the heat exchanger 39 is lower than the inlet temperature, the components 34, 35 are cooled particularly effectively. Therefore, this arrangement allows components that are especially temperature-sensitive or that generate a great deal of heat to be cooled at very low coolant temperatures.

FIG. 3 shows another embodiment of a fuel cell system 100 according to the invention. The embodiment shown here differs from that of FIG. 2 essentially in that the heat exchanger 39 is arranged together with the fuel cell stack 10 in the main circuit 41.1 of the coolant path 41. In the embodiment shown here, the fuel cell stack 10 is situated upstream from the heat exchanger 39 in the main coolant circuit 41.1. In this manner, the coolant heated by the fuel cell stack 10 is pre-cooled in the heat exchanger 39 before it is cooled down again in the main cooler 43. Therefore, the heat exchanger 39 reduces the temperature of the entire coolant circuit 41.

LIST OF REFERENCE NUMERALS

100 fuel cell system
100' conventional fuel cell system
10 fuel cell stack
11 individual cell
12 anode space
13 cathode space
14 polymer electrolyte membrane
20 anode gas supply system
21 anode supply path
22 anode exhaust gas path
23 fuel tank
30 cathode gas supply system
31 cathode supply path
32 cathode exhaust gas path
33 compressor
34 electric motor
35 power electronics
36 turbine
37 heat exchanger/intercooler
38 humidifier
39 heat exchanger (heat-transferring contact with the coolant/cathode exhaust gas)
40 fuel cell cooling system
41 coolant path
41.1 coolant main circuit
41.2 coolant side branch
41.3 coolant side branch
42 coolant pump
43 main cooler
44 cooler bypass line
45 three-way valve
46 heater

What is claimed is:
1. A fuel cell system comprising:
a fuel cell stack;
a cathode gas supply system comprising a cathode supply path for feeding cathode operating gas into the fuel cell stack and a cathode exhaust gas path for discharging cathode exhaust gas out of the fuel cell stack;
a fuel cell cooling system for cooling the fuel cell stack and comprising a coolant path, the fuel cell stack being integrated into the coolant path so as to transfer heat,
the cathode gas supply system further comprising a turbine arranged in the cathode exhaust gas path, the coolant path being in heat-transferring contact with the cathode exhaust gas path downstream from the turbine.
2. The fuel cell system as recited in claim 1 wherein cathode gas supply system further comprises a humidifier, the cathode exhaust gas flowing through the humidifier, the coolant path being in heat-transferring contact with the cathode exhaust gas path downstream from the humidifier.

3. The fuel cell system as recited in claim 2 wherein the humidifier is arranged upstream from the turbine in the cathode exhaust gas path.

4. The fuel cell system as recited in claim 1 wherein, aside from the fuel cell stack, at least one additional component to be cooled is integrated into the coolant path.

5. The fuel cell system as recited in claim 4 wherein the at least one additional component is a component of the fuel cell system.

6. The fuel cell system as recited in claim 5 wherein the at least one additional component is an electric motor of an electric compressor.

7. The fuel cell system as recited in claim 6 wherein the at least one additional component is power electronics of the electric motor.

8. The fuel cell system as recited in claim 4 wherein the at least one additional component and the heat-transferring contact of the coolant path with the cathode exhaust gas path are connected in series in the coolant path.

9. The fuel cell system as recited in claim 8 wherein the at least one additional component is arranged downstream from the heat-transferring contact of the coolant path with the cathode exhaust gas path.

10. The fuel cell system as recited in claim 1 wherein the fuel cell stack and the heat-transferring contact of the coolant path with the cathode exhaust gas path are connected in parallel to each other in the coolant path.

11. The fuel cell system as recited in claim 1 wherein the fuel cell stack and the heat-transferring contact of the coolant path with the cathode exhaust gas path are connected in series in the coolant path.

12. The fuel cell system as recited in claim 11 wherein the fuel cell stack is arranged upstream from the heat-transferring contact.

13. The fuel cell system as recited in claim 1 further comprising a heat exchanger effectuating the heat-transferring contact of the coolant path with the cathode exhaust gas path.

14. The fuel cell system as recited in claim 1 further comprising a heat exchanger arranged in the cathode supply path and integrated into the coolant path in order to cool or heat the cathode operating gas.

15. The fuel cell system as recited in claim 1 wherein the coolant path returns to the fuel cell stack downstream from the heat-transferring contact.

16. A vehicle comprising the fuel cell system as recited in claim 1.

* * * * *